United States Patent [19]

Vrancken et al.

[11] 4,206,025
[45] Jun. 3, 1980

[54] RADIO-HARDENABLE ACRYLIC POLYESTERS

[75] Inventors: August Vrancken, Dworp; Paul Dufour, Ruisbroek, both of Belgium

[73] Assignee: U C B, Societe Anonyme, Saint-Gilles-lex-Bruxelles, Belgium

[21] Appl. No.: 940,512

[22] Filed: Sep. 5, 1978

[30] Foreign Application Priority Data

Sep. 5, 1977 [GB] United Kingdom ............... 36921/77

[51] Int. Cl.$^2$ .......................... C08F 8/00; C08G 18/00
[52] U.S. Cl. .......................... 204/159.16; 204/159.19; 525/434; 525/437; 528/176; 528/192; 528/299; 528/300
[58] Field of Search ................ 260/872, 873; 528/273, 528/297, 299, 300, 301, 303, 304, 306, 176, 177, 192, 194; 204/159.16, 159.19

[56] References Cited

U.S. PATENT DOCUMENTS

| | | | |
|---|---|---|---|
| 3,992,276 | 11/1976 | Powanda et al. | 260/873 X |
| 4,035,320 | 7/1977 | Lawson | 260/873 X |
| 4,035,321 | 7/1977 | Shahidi et al. | 260/873 X |
| 4,115,330 | 9/1978 | Lawson | 260/873 X |

*Primary Examiner*—Lucille M. Phynes
*Attorney, Agent, or Firm*—Wenderoth, Lind & Ponack

[57] ABSTRACT

Radio-hardenable acrylic polyesters of the general formula:

$$[A\text{-}B\text{-}C\text{-}D_m]_2 \quad (I)$$

wherein A is the radical of a linear polyester of the general formula:

$$-O-[R_1-R_2]_x R_1-O- \quad (II)$$

wherein $R_1$ is a radical derived from at least one dihydroxylated compound, $R_2$ a radical derived from at least one dicarboxylic acid and x an integer from 1 to 20; wherein B has the same meaning as $R_2$, C is a radical derived from at least one aliphatic polyhydroxylated compound, D a radical derived from acrylic acid and m is an integer from 2 to 7.

Manufacture of said polyesters and use as binders in radio-hardenable compositions.

10 Claims, No Drawings

RADIO-HARDENABLE ACRYLIC POLYESTERS

The present invention is concerned with new radio-hardenable acrylic polyesters which harden at high speed by ultra-violet irradiation or bombardment by accelerated electrons and which exhibit remarkable technological properties, which are capable of being readily adapted to any application which arises; the present invention is also concerned with the manufacture and use of these new acrylic polyesters as binders in radio-hardenable compositions The expression "acrylic polyesters" used in the present invention is to be understood to mean polymerisable organic compounds obtained by the polyesterification of dicarboxylic acid with a stoichiometric excess of OH groups of di- and polyhydric alcohols, the excess hydroxyl groups being then esterified with acrylic acid or one of its functional derivatives; when the acrylic polyesters which are thus obtained contain a sufficient number of $CH_2=CH-COO-$ groups, they are "radio-hardenable" at an industrial acceptable rate, by means of ultra-violet rays or accelerated electrons which serve as a source of free radicals.

The acrylic polyesters in this category have already been the subject of numerous articles and patents. In this respect, the scientific and technological articles by Russian authors such as A. A. BERLIN et al., T. E. LIPATOVA, MOGILEVICH et al., Ya. L. RASKIN et al., and the like, are cited, these articles relating to acrylic polyesters in general but to methacrylic polyesters in particular. In the patent literature, in particular Russian Patent Specifications Nos. 132,745; 132,819; 172,487; 179,618; 180,335; 181,280; 197,401-3; 202,731; 215,497; 224,793; 229,800; 233,906; 246,321; 254,071; 260,165; 309,001; 320,515; 328,122 and 341,896; U.S. Pat. Nos. 3,655,823; 3,287,292 and 3,432,478; Belgian Patent Specifications Nos. 774,777; 814,979; 821,408 and 831,185; British Patent Specifications Nos. 1,089,183 and 1,258,272; German Patent Specifications Nos. 2,145,767; 2,261,612 and 1,269,343; and French Patent Specification No. 2,016,568 are mentioned.

Typical representatives of the state of the art include the following:
bis-(ethylene glycol) dimethacrylylated adipate,
bis-(diethylene glycol) dimethacrylylated phthalate,
tetraacrylated sorbitol pelargonate,
bis-(glyceryl)tetramethacrylylated sebacate (or phthalate),
bis-(pentaerythritol) hexaacrylylated or hexamethacrylylated adipate,
tri-(pentaerythritol) octamethacrylylated diadipate,
products of telomerisation-addition of epoxy compounds to anhydrides of (meth)acrylic and polyvalent acids
condensation products of (meth)acrylic acid with hydroxylated esters of the esterification product of polycarboxylic acids and epoxy compounds,
(meth)acrylylation products of hydroxylated oligoesters or, conversely, reaction products of a diacid chloride with trimethylol ethane di(meth)- acrylate or other polyol and the like.

In spite of the considerable number of acrylic polyesters proposed hitherto, there are few which, as polymers alone, have found industrial application. More often than not, they are used in relatively small quantities to modify other more conventional polymers. The reasons for this situation are many and varied:

(a) the acrylic polyesters of the class considered here are often produced from relatively expensive and/or hazardous raw materials which give rise to technological and/or ecological problems; this is, for example, the case with the use of acid chlorides and epoxy compounds;

(b) the yields obtained are often disappointing, which considerably increases their cost, a corollary of this being a lack of competitivity vis-a-vis other less expensive conventional products which are already well established on the market;

(c) while still in a non-hardened condition, the acrylic polyester in question here must have technological properties which are quite specific for each industrial application envisaged. Among these, the viscosity plays a primary role; indeed, for certain application, the viscosity required may be only a few poises (for example in flexography) while for others it may be as much as several hundred poises (for example in offset printing), or even several thousand poises (for example adhesives of the "hot melt" type). It is true that the viscosity can be regulated by means of auxiliary substances but this will generally be to the detriment of the hardening rate of the composition containing the polyester;

(d) a high hardening rate is not the only criterion required of a radio-hardenable acrylic polyester; it is also necessary that, when this has been hardened by ultra-violet irradiation or by an electron beam, it should provide a film having good mechanical properties (tensile strength,/bending strength surface hardness and the like) and other particular properties, such as good resistance to solvents, a good spreading rate, good wettability, good adhesion to all manner of undersurfaces and the like. It will be noted that these requirements are often contradictory, for example suppleness and surface hardness of the film of hardened acrylic polyester.

From the foregoing, it will be evident that radio-hardenable acrylic polyesters are still open to considerable improvement, whether in terms of choice of raw materials or method of manufacture or mechanical and technological properties or prime cost.

Consequently, the present invention, which relates to radio-hardenable acrylic polyesters of the type described above, has as its objects:

the preparation of polyesters on a basis of less expensive and readily available raw materials;

the use of a manufacturing process which is advantageous with regard to the technical and economic aspects of these polyesters and gives good yields;

the minimising of ecological problems at the manufacturing stage and also from the point of view of application;

the obtaining of acrylic polyesters which, even during the course of manufacture, may be adapted to their future applications, simply by varying certain manufacturing parameters. This is equivalent to saying that these acrylic polyesters, although belonging to the same family of compounds, can be made "to measure", according to the commercial application for which they are intended;

the production, by means of these acrylic polyesters, of coating compositions, varnishes, paints, inks and adhesives for laminated materials, the quality of which is at least equal to that of the known acrylic polyesters.

These and other objects are achieved by the present invention, which relates to new radio-hardenable acrylic polyesters of the general formula:

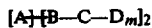  (I)

wherein A is the radical of a linear polyester and being of the general formula:

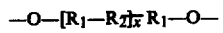  (II)

wherein $R_1$ is a radical derived from at least one dihydroxylated compound selected from the group consisting of aliphatic dihydroxylated alcohols, aliphatic dihydroxylated ether-alcohols and oxyalkylation products of said alcohols and ether-alcohols and of aromatic dihydroxylated compounds, $R_2$ is a radical derived from at least one dicarboxylic acid selected from the group consisting of acids in which each carboxyl group is in the alpha position with respect to groups chosen from —$CH_2$—, $>CH$— and $>C$—; acids in which one carboxyl group is in the alpha position with respect to a $>CH$— group, the other carboxyl group being in the alpha position with respect to a $>C$— group, as well as the anhydrides of said acids, x is an integer from 1 to 20, B has the same meaning as $R_2$, C is a radical derived from at least one aliphatic polyhydroxylated compound selected from the group consisting of aliphatic polyhydroxylated alcohols and aliphatic polyhydroxylated ether-alcohols containing m+1 OH groups, one of which is esterified with B and the remaining m OH groups are esterified with D, as well as their oxyalkylated derivatives.

D is a radical derived from acrylic acid and m is an integer from 2 to 7, with the proviso that, when $R_2$ and B both represent radicals derived from dicarboxylic acids in which each carboxyl group is in the alpha position with respect to a —$CH_2$—group, the $R_1$ must contain at least one secondary OH group.

It will be noted that when x=1 in general formula (II), the A—$B_2$ grouping in general formula (I) already constitutes a linear polyester containing 4 internal ester groups and 2 terminal carboxyl groups.

When examining the significance of the symbols in general formulae (I) and (II) given above, it can be seen that the radio-hardenable acrylic polyesters of the present invention are produced from raw materials which are not very expensive and are readily available; indeed, $R_1$ is formed from at least one aliphatic dihydroxylated alcohol or ether-alcohol or oxyalkylation product of this alcohol or ether-alcohol or a diphenol, $R_2$ and B are formed from at least one dicarboxylic acid (or anhydride), C is formed from at least one polyhydroxylated aliphatic alcohol containing 3 to 8 OH groups and D is formed from acrylic acid.

This constitutes a first advantage over known radio-hardenable acrylic polyesters which use, as raw materials, particularly acid chlorides and/or epoxy compounds, which are expensive products, dangerous to handle and which give rise to considerable corrosion in the production equipment.

Examples of aliphatic dihydroxylated alcohols or ether-alcohols used for the formation of $R_1$ in general formula (II) include, in particular, ethylene glycol, propylene-1,2- and -1,3-glycol, butane-1,4-, 1,3- and -2,3-diol, hexane-1,6-diol, neopentyl glycol, diethylene glycol, dipropylene glycol, dibutylene glycol, the polyethylene glycols, the polypropylene glycols and the like. It is also possible to use the oxyalkylated compounds (especially oxyethylated and oxypropylated) of the alcohols or ether-alcohols mentioned above and also those of aromatic dihydroxylated compounds, such as bisphenol A, pyrocatechol, resorcinol, hydroquinone, p-xylene glycol, p-hydroxybenzylic alcohol and the like.

The dicarboxylic acids (or anhydrides) use for the formation of $R_2$ in general formula (II) or of B in general formula (I) can be dicarboxylic acids in which each carboxyl group is in the alpha position with respect to groups chosen from —$CH_2$—, $>CH$—, and $>C$—, and dicarboxylic acids in which one carboxyl group is in the alpha position with respect to a $>CH$— group, the other carboxyl group being in the alpha position with respect to a $>C$— group. Specific examples of such acids are malonic, succinic, glutaric, adipic, pimelic, suberic, azelaic, sebacic and the like acids and their anhydrides (both carboxy groups in the alpha position with respect to a —$CH_2$— group); maleic, fumaric, cyclohexane-1,4-dicarboxylic, 1,2-dihydrophthalic, $\Delta^4$-tetrahydrophthalic and the like acids and their anhydrides (both carboxy groups in the alpha position with respect to a $>CH$— group); 1,6-dihydrophthalic and the like acids and their anhydrides (one carboxy group in the alpha position with respect to a $>CH$— group, the other in the alpha position with respect to a $>C$— group); o-phthalic, isophthalic, terephthalic, 3,6-dihydrophthalic-1,2; 4,5-dihydrophthalic-1,2; tetrachloro(or bromo)phthalic and the like acids and their anhydrides (both carboxy groups in the alpha position with respect to a $>C$— group).

Examples of aliphatic polyhydroxylated alcohols or ether-alcohols containing 3 to 8 OH groups used for the formation of C in general formula (I) include trimethylolethane, trimethylolpropane, pentaerythritol, di- and tripentaerythritol, sorbitol and the like, but with the exception of glycerol, in view of the fact that, by virtue of the proximity of the OH groups inter se, etherification reactions and premature gelification of the polyester readily arise. Instead of free polyhydroxylated aliphatic compounds, it is, for the purpose of the present invention, also possible to use their oxyalkylated derivatives, particularly their oxyethylation or oxypropylation products, including those of glycerol (because in an oxyalkylated glycerol the OH groups are far more widely separated from one another than in glycerol itself).

In the polyesters according to the present invention, the radical D in general formula (I) is solely the acrylic radical $CH_2$=CH—COO—, thus excluding the methacrylic radical $CH_2$=C($CH_3$)—COO— and other alpha-substituted radicals which, not being sufficiently reactive, are not suitable for the purposes of the present invention. The acrylic radical is derived from acrylic acid proper, which is readily commercially available and does not have the disadvantages of the other functional derivatives of acrylic acid, for example the acrylyl halides known for their corrosive activity, or the alkyl acrylates, the use of which would necessitate a transesterification reaction (involving the risk of partial cleavage of the chain of the linear polyester A), producing an end product which is of poor quality and a concomitant drop in the yield of desired product.

As an illustration of acrylic polyesters which satisfy general formula (I), particularly the following may be quoted:

condensation product of 2 moles of phthalic anhydride with 3 moles diethylene glycol+2 moles adipic acid (for the formation of A—B$_2$), then with 2 moles pentaerythritol (=C) and 6 moles acrylic acid (D);

condensation product of 4 moles adipic acid with 5 moles dipropylene glycol + 2 moles adipic acid (for the formation of A—B$_2$), then with 2 moles trimethylolpropane (C) and 4 moles acrylic acid (D);

condensation product of 2 moles tetrahydrophthalic anhydride with 3 moles hexane-1,6-diol+2 moles adipic acid (for the formation of A—B$_2$), then with 2 moles trimethylol propane (C) and 4 moles acrylic acid (D);

condensation product of 2 moles phthalic anhydride with 3 moles tetraethylene glycol+2 moles phthalic anhydride (for the formation of A—B$_2$), then with 2 moles Pluracol PeP* (C) and 6 moles acrylic acid (D).

* product of condensation of 1 mole pentaerythritol with 7 moles ethylene oxide.

The essential characteristic feature common to all the compounds satisfying general formula (I) is the presence in each molecule of a dihydroxylated linear polyester (the radical of which is A) and a dicarboxylated linear polyester (the radical of which is A—B$_2$). For convenience and clarity of explanation, this linear polyester will be called a "prepolymer". Reference will, therefore, be made to prepolymer A when referring to the dihydroxylated linear polyester A and to prepolymer A—B$_2$ when referring to the dicarboxylated polyester A—B$_2$. Fixed then on the prepolymer A—B$_2$ are the polyhydroxylated compound and the acrylic acid, the radicals of which are respectively designated (C) and (D) in general formula (I) in order to obtain radiohardenable acrylic polyesters according to the present invention.

It has been stated above that the prepolymer "A" or "A—B$_2$" must be linear. It has, indeed, been found that a linear prepolymer is more advantageous than a branched prepolymer for the purposes of the present invention. This conclusion is derived from work carried out by us, during the course of which acrylic polyesters were made having substantially the same molecular weight (between 1100 and 1200) but which differed in the structure of the basic prepolymer chain. The results obtained are reproduced in Table 1, in which the abbreviations used have the following meanings:

AAD=adipic acid
BuD=butane-1,4-diol
PE=pentaerythritol
AA=acrylic acid
TMP=trimethylol propane
ASUC=succinic anhydride
DEG=diethylene glycol
AP=phthalic anhydride
BuDA=butane-1,4-diol diacrylate
TMPTA=trimethylolpropane triacrylate
DEGDA=diethylene glycol diacrylate

TABLE 1*

| poly-ester | Theoretical composition and representation | Viscosity in poises at 25° C. | % polyacrylate | Talc reactivity in m/sec |
|---|---|---|---|---|
| a | linear structure [(2DEG + 3AP) + 2PE] + 6AA theoretical molecular weight = 1200 | 3000 | 2% DEGDA | 3.5 |
| b | three branched structure (1TMP + 3ASUC) + 3TMP + 6AA theoretcial molecular weight = 1100 | 226 | 20% TMPTA | 1.4 |
| c | four branched structure [(1PE + 3AAD) + 2TMP + 1BuD] + 6AA theoretical molecular weight = 1150 | 445 | 5% BuDa 5% TMPTA | 1.8 |
| d | six branched structure [(2PE + 3ADD) + 2BuD] + 6AA theoretical molecular weight = 1100 | 390 | 10% BuDA | 2.0 |

*To be certain of the structure obtained, the polyesters were prepared in three stages: first formation of the polymer A-B$_2$ given in parentheses, then reaction of this with the diol or polyol shown in square brackets, then reaction of the polyester in square brackets with the acrylic acid.

From the "viscosity" column it can be seen that polyester (a), which contains a prepolymer according to the present invention, has a far higher viscosity than that of polyesters (b), (c) and (d).

The "% polyacrylate" column shows the percentage of parasite ester which has formed between the acrylic acid and the diol or polyol, in addition to the prepolymer desired. This parasite product is the result of transesterification and represents a loss of yield of polyester according to the present invention. These acrylates of diols or polyols can no longer be separated from the desired prepolymers and they proved undesirable for certain applications (for example offset), not overlooking the fact that they reduce reactivity. From the above Table, it will be seen that this loss is only 2% in the case of polyester (a) according to the present invention, while, in the case of polyesters with branched chains (b), (c) and (d), it is at least 10% and may even be as much as 20%.

To measure the reactivity to talc in m/second indicated in the last column of the above Table, the following procedure is adopted: to the polyester to be tested, add 6% by weight of a benzophenone/Michler ketone mixture with a weight ratio of 4:1, then, using a bar coating machine, apply a coating 12 microns thick using the product obtained, which is applied to a strip of coated paper. The strip is then passed at a given speed in front of an 80 W/cm lamp provided with a semi-elliptical reflector, the strip being 8 cm. from the lamp. Immediately after passing under the lamp, a finger is used to apply talc to half the coated strip, after which an absorbent paper is used to wipe lightly five times over the talc-covered part. Then the two parts are compared under an oblique light. If the coating is effectively hardened, the part treated with talc will have the same brilliance as the other part and there will be no halo at the separation of the two parts. If, on the other hand, the part treated with talc has become duller than the other part, this is because the hardening is not complete and because the dose of ultra-violet radiation received is not sufficient. Reactivity to talc is the maximum speed expressed as meters per second at which the part treated with talc remains as brilliant as the other part. Table 1 shows that the reactivity of polyester (a) according to the present invention, hence the prepolymer which is based on a linear chain, is far higher than that of polyesters (b), (c) and (d), which are not in accordance with the present invention, in which the basic prepolymer has a branched chain.

In the definition given above of radio-hardenable acrylic polyesters which satisfy the general formula (I), it has been stipulated that when $R_2$ and B both represent radicals of dicarboxylic acids, each COOH group of which is carried by a —$CH_2$— group in the alpha-position, then $R_1$ (the radical of dihydroxylated alcohol or ether-alcohol) must contain at least one secondary OH group. The result is that, for the preparation of the prepolymer A or A—$B_2$, it is not possible only to use carboxylic diacids, each COOH group of which is carried in the alpha-position by a —$CH_2$— group, only with diols containing only primary OH groups. If the diol is "diprimary", the diacid must have at least one COOH group carried in alpha-position by a =CH— or $\gtreqless$C— group but if the diol contains at least one secondary OH group, then the COOH groups of the diacid may be carried, as desired, by a —$CH_2$, =CH— or $\gtreqless$C— group in the alpha-position. On the other hand, if the diacid has its two COOH groups carried by a —$CH_2$ group, the diol must contain at least one secondary OH group, whereas if the diacid has at least one of its COOH groups carried by a =CH— or $\gtreqless$C— group, the OH groups of the diol may be any groups, i.e. diprimary, disecondary or both primary and secondary. If these conditions are not observed, the result is that, subsequently, during the course of acrylylation, there will be considerable transesterification between the diol used for preparing the prepolymer and the acrylic acid, with a concomitant loss of yield of polyester of general formula (I) and of reactivity to the source of radio-hardening (see Example 3).

The presence of the central linear chain prepolymer in the acrylic polyesters according to the present invention makes it possible to modify, at will, their physical, chemical and technological properties in order to adapt them to their future use.

A first fact to be established is that the prepolymer A or A—$B_2$, in comparison with branched chain prepolymers which have the same molecular weight and the same reactivity, provides greater suppleness to the final acrylic polymers. The more the chain of the linear prepolymer according to the present invention is extended, the greater the pliability will be. However, at the same time as the molecular weight increases, the viscosity also increases but the reactivity diminishes. If it is desired to maintain the reactivity at the same time as the length of the prepolymer chain is increased, then various possibilities are available. First, it is possible to esterify the prepolymer A—$B_2$ with a polyhydroxylated compound C which has a higher content of hydroxyl groups, for example to replace pentaerythritol by dipentaerythritol or tripentaerythritol, which makes it possible to fix, instead of 6 acrylyl groups, 10 and 14 acrylyl groups, respectively, per molecule of final polyester, with a concomitant adjustment of the reactivity. Another possibility of maintaining or increasing the reactivity of the polyester is wholly or partially to replace the dicarboxylic acid (or anhydride) $R_2$ or the diol $R_1$ in general formula (II) by a dicarboxylic acid (or anhydride) or halogenated diol, for example tetrachloro- (or bromo)-phthalic anhydride, the halogen atoms of which are attached to carbon atoms having the electronic configuration $sp^2$, as suggested in Belgian Patent Specification No. 841,681.

By means of the linear prepolymer A—$B_2$, it is possible, therefore, to obtain a high degree of suppleness by regulating the length of the chain (value x in the general formula (II)). However, it is also possible to modify the degree of flexibility and rigidity by choosing appropriate diacids and diols or by modifying or not modifying the value of x. To improve the suppleness, diols and diacids containing at least 6 carbon atoms will preferably be used for $R_1$ and $R_2$. For $R_1$, for example, hexane-1,6-diol, octane-1,8-diol and, generally speaking, higher diols $HO(CH_2)_nOH$ will be used, in which n has a value of from 6 to 36. For $R_2$, for example, adipic acid and higher dicarboxylic acids $HOOC(C_2)_nCOOH$ can be used, in which n has a value of from 4 to 34. Other softening compounds include ether diols, for example the oxyalkylation products of diols with an alkylene oxide, such as ethylene oxide and propylene oxide. If, on the other hand, it is desired to impart rigidity to the acrylic polyesters of the present invention, diacids and dialcohols will be used which contain aromatic nuclei, for example phthalic anhydride, or in which the aliphatic molecule is sterically hindered by radicals, for example neopentyl glycol. It will be seen, therefore, that by modifying the value of x, on the one hand, and the nature of the components $R_1$ and $R_2$ of the prepolymer A or A—$B_2$, on the other, it is possible to have acrylic polyesters according to the present invention which combine two contradictory properties: flexibility and surface hardness of the film.

Another aspect of the present invention is that, by virtue of the linear prepolymer A or A—$B_2$, it is possible to adapt the final acrylic polyester to the nature of the surface on which the polyester film is deposited. To facilitate wetting of hydrophilic surfaces, it is possible to incorporate polar molecules into the prepolymer while, for lipophilic surfaces, on the other hand, compounds of a more or less pronounced fatty character will be incorporated.

During the course of systematic tests, we have found that polyesters according to the present invention which have certain structures offer better adhesion to certain surfaces than do others. It is easy for the art skilled to benefit from these observations to optimise the composition of the prepolymer and of the final acrylic polyester in order to apply it to a given substrate.

It is also possible to adapt the prepolymer and the acrylic polyester of the present invention to suit other requirements. If, for example, it is desired to obtain a good resistance to abrasion, it will be advantageous to use, as diol component, neopentyl glycol. If, on the other hand, it is desired to obtain the greatest possible resistance to chemical action or hydrolysis, it will be possible, in particular, to incorporate into the prepolymer as acid such as HET acid, aromatic diacids, such as phthalic anhydride, and diols containing at least one secondary OH group.

Preparation of the acrylic polyesters according to the present invention

There are several possible processes for preparing compounds of general formula (I):

I. Under conventional esterification conditions, the molar proportions of all the constituents needed for preparation of a polyester of general formula (I) are reacted together, i.e. at least one dicarboxylic acid ($R_2$ in formula (II), B in general formula (I)), at least one dihydroxylated compound ($R_1$ in general formula (II)), at least one polyhydroxylated aliphatic compound (C in general formula (I)), and acrylic acid (D in general formula (I)). This method does, however, have the drawback that parasite esterification and transesterification reactions may occur, which reduce the final yield of desired product. Therefore, preference is given to the following processes:

IIa. First, prepolymer A—$B_2$ having two terminal COOH groups is prepared from at least one dicarboxylic acid (radical $R_2$ in general formula (II), radical B in general formula (I)) and at least one dihydroxylated compound (radical $R_1$ in general formula (II) in the proportions required in order to obtain both the desired length of chain x and termination of the two ends of the chain by a carboxyl group. Two alternatives are possible at this stage:

1. An excess of dicarboxylic acid(s) over dihydroxylated compound(s) is used, which makes it possible to prepare, in one stage, the polyester A—$B_2$ which has two terminal COOH groups, or
2. First, a prepolymer is prepared (A in general formula (I)), which has two terminal OH groups, by condensation of at least one dicarboxylic acid ($R_2$ in general formula (II)) with an excess of dihydroxylated compound(s) ($R_1$ in general formula (II)), after which this dihydroxylated prepolymer is esterified with at least one dicarboxylic acid (B in general formula (I)), the same as or different from that (or those) used for the preparation of the dihydroxylated prepolymer (A).

IIb. To complete the preparation of the acrylic polyester of general formula (I), one mole of prepolymer A—$B_2$, prepared as in IIa, is reacted with 2 moles of polyhydric compound (the radical of which is designated C in general formula (I) and which contains $m+1$ hydroxyl groups) and with $2 \times m$ moles acrylic acid (D). Here again there are various procedures available:

(1) the three constituents A—$B_2$, C and D are reacted together in the molar proportions indicated, in a single stage, or
(2) first, each COOH group of the prepolymer A—$B_2$ is reacted with one of the $m+1$OH groups of the polyhydric compound (C) and then the $2 \times m$ OH groups remaining are esterified with acrylic acid, or
(3) first, m OH groups of the polyhydric compound (C) which contains $m+1$ OH groups are esterified with acrylic acid (D) and then 2 moles of this acrylate (which also contains one free OH group) are esterified with one mole of the polyester A—$B_2$.

The preferred procedures are those described in IIa.1 and IIb.1.

The conditions of esterification used for preparation of the acrylic polyesters according to the present invention are conventional in themselves, viz. it is possible to use an esterification catalyst, for example p-toluenesulphonic acid, and heat the reagents in the presence of a radical polymerisation inhibitor, such as hydroquinone methyl ether (to prevent premature polymerisation of the acrylic radicals contained in the molecule) and an azeotropic solvent, such as benzene, toluene or xylene (to entrain the water of esterification from the system by azeotropic distillation). The degree of esterification is monitored by determination of the acid index. Hereinafter will be given detailed examples of the production of acrylic polyesters according to the present invention.

The acrylic polyesters of the present invention are liquids which generally are of relatively high viscosity, ranging from a few hundred to a few thousand poises. However, for certain industrial applications it is necessary to lower the viscosity of the acrylic polyesters thus obtained. Obviously this result can be achieved by adding non-polymerisable or polymerisable diluents. However, according to an advantageous method of preparing acrylic polyesters according to the present invention which are required to have a relatively low viscosity ranging from ten or so to a few hundred poises, the following procedure may be used:

Instead of forming only the acrylic polyester of general formula (I) when it is made, a sufficiently large quantity of polyhydroxylated compound (radical C in general formula (I)) and acrylic acid (radical D in general formula (I)) is used to form not only the desired acrylic polyester of general formula (I) but also a mole of acrylic ester of the general formula:

$$C(D)_{m+1} \qquad (III)$$

in which the symbols C, D and m have the same meanings as in formula (I). This, form
phthalic anhydride (AP): 2 moles
neopentyl glycol (NPG): 3 moles
adipic acid (AAD): 2 moles
pentaerythritol (PE): 3 moles and
acrylic acid (AA): 10 moles
the following are produced at the same time

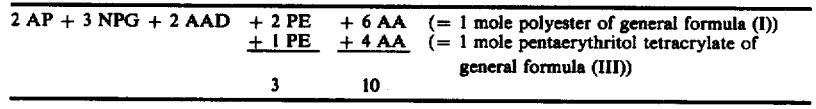

| 2 AP + 3 NPG + 2 AAD | + 2 PE | + 6 AA | (= 1 mole polyester of general formula (I)) |
|---|---|---|---|
| | + 1 PE | + 4 AA | (= 1 mole pentaerythritol tetracrylate of general formula (III)) |
| | 3 | 10 | |

The advantage of this alternative procedure is that it makes it possible, in a single stage, to obtain a mixture of a polyester of general formula (I) with a polymerisable diluent of general formula (III), avoiding the need to carry out two separate syntheses plus an operation to mix these two compounds which are thus prepared individually. Thus, there is at once an economy in synthesis and a saving in handling.

The radio-hardenable acrylic polyesters according to the present invention are intended to serve mainly as binders in the manufacture of compositions which can be hardened by ultra-violet irradiation or by bombardment with accelerated electrons, the compositions being particularly useful as coatings, varnishes, paints, inks and adhesives for laminates which harden extremely rapidly. These radio-hardenable compositions contain 5 to 100 parts by weight of polyester binder according to the present invention per 100 parts by weight of composition. In addition to the polyester binder according to the present invention, these compositions can contain various auxiliary and conventional constituents which are essential if they are to be adapted to the industrial applications mentioned above. These auxiliary constituents include the following: diacrylates of a diol (or ether diol) or polyacrylates of a polyol (or ether polyol); a photo-initiator system; adjuvants; fillers; pigments or dyes.

Di- or polyacrylates of diols (or ether diols) or polyols (or ether-polyols)

In particular, appropriate diacrylates of diols or ether-diols include butane-1,4-diol diacrylate, hexane-1,6-diol diacrylate, neopentyl glycol diacrylate, di-, tri and/or tetraethylene glycol diacrylate. These esters may be used alone or in mixture inter se.

As polyacrylates of polyols or ether-polyols, particularly trimethylolethane triacrylate, trimethylopropane triacrylate, pentaerythritol tetracylate, dipentaerythritol hexacrylate and the like are to be mentioned. It was stated above that these polyacrylates or polyols or ether-polyols may already be formed in situ at the same time as the acrylic polyester according to the present invention; however, it is also possible to add them subsequently to the radio-hardenable compositions according to the present invention, together with other auxiliary agents.

The di- and polyacrylates are intended to lower the viscosity of the radio-hardenable compositions. Since these di- and polyacrylates contain polymerisable acrylic radicals, they also participate in the radio-hardening process. According to the applications for which the radio-hardenable compositions are intended, they may contain 0 to 90 parts by weight of diol (ether diol) diacrylate and/or polyol (ether polyol) polyacrylate per 100 parts of radio-hardenable compositions according to the present invention.

Photo-initiator system

For the radio-hardening of the compositions according to the present invention with accelerated electrons, it is not necessary to use a photo-initiator system, since this type of radiation itself ensures a sufficiently extensive production of free radicals for the hardening to take place extremely rapidly. On the other hand, when it is necessary to photo-harden the compositions according to the present invention using rays with a wavelength of from 200 to 500 nanometers (ultra-violet radiation), the presence of a photo-initiator system is indispensable, this photo-initiator system including photo-sensitisers and/or photo-initiators. The photo-sensitisers, through the intermediary of the unsaturated system(s) of the composition according to the present invention or a photoinitiator, produce free radicals or ions which initiate cross-linking (hardening) of the composition.

With regard generally to photo-sensitisers or photo-initiators which may be used in the present invention, reference is made particularly to the following literature references:

G. DELZENNE, Ind. Chim.Belge, 24,(1959),739-764.
J. KOSAR, "Light Sensitive Systems", publ. Wiley, New York, 1965
N. J. TURRO, "Molecular Photochemistry", publ. Benjamin Inc., New York, 1967.
H. G. HEINE, H. J. ROSENKRANZ, H. RUDOLPH, Angew.Chem.84,(1972),1032.

The photo-initiators are essentially chemical substances belonging to one of the following major groups:

compounds containing carbonyl groups, such as pentanedione, benzil, piperonal, benzoin and its halogenated derivatives, ethers of benzoin, anthraquinone and its derivatives, p,p'-dimethylamino-benzophenone, benzophenone and the like;

compounds containing sulphur or selenium, such as di- and polysulphides, xanthogenates, mercaptans, dithiocarbamates, thioketones, beta-naphthoselenazolines;

peroxides;

compounds containing nitrogen, such as azonitriles, diazo compounds, diazides, derivatives of acridine, phenazine, quinoxaline, quinazoline and oxime esters, for example 1-phenyl-1,2-propanedione 2-[0-(benzoyl)-oxime];

halogenated compounds, such as halogenated ketones or aldehydes, methyl aryl halides, sulphonyl halides or dihalides;

photo-initiating dyes, such as diazonium salts, azoxybenzenes and derivaties, rhodamines, eosines, fluoresceine, acriflavine and the like.

The photo-sensitisers belong to one of the following groups: ketones and their derivatives, carbocyanines and methines, polycyclic aromatic hydrocarbons, such as anthracene and the like, dyes, such as xanthenes, safranines and acridines.

The compositions according to the present invention contain 0 to 35 and preferably 0 to 20 parts by weight of photo-initiators and/or photo-sensitisers per 100 parts by weight of composition according to the present invention.

Adjuvants

As examples of adjuvants, the following may be mentioned:

known heat and light stabilisers;
known anti-oxidising agents;
known viscosity modifiers or thixotropic agents;
known dispersing agents;
chain transfer agents serving to accelerate radical polymerisation once it has been started; examples of these agents include mercaptans and xanthogenates, di- and triamines, alkanolamines, monoalkyldialkanolamines and dialkylmonoalkanolamines, morpholine and its derivatives, polyamines, N-phenyl glycine and its derivaties, N,N'-dimethyl monoethanolamine monoacrylate, N-methyldiethanolamine diacrylate, triethanolamine triacrylate and the like;
polymerisation inhibitors intended to ensure stability during storage, for example quinones, hydroquinones, substituted phenol derivatives, primary aromatic amines, copper compounds and the like;
waxes, the role of which is to promote the formation of non-creasing hardened films, waxes which may be natural, such as candelilla wax, Carnauba wax and the like, or synthetic waxes, such as polyethylene, polypropylene, paraffin, chlorinated paraffin, chlorinated naphthalene waxes and the like.

According to the intended applications, the photo-hardenable compositions according to the present invention contain 0 to 10 and preferably 0 to 5 parts by weight of these adjuvants per 100 parts by weight of the composition according to the present invention.

Fillers

The fillers used in the radio-hardenable compositions according to the present invention may be transparent to ultra-violet rays, i.e. they may have a minimum absorption at wavelengths of 200 to 500 nanometers of the spectrum, for example precipitated or micronised magnesium or calcium carbonate (calcite, aragonite and the like), hydrated micronised magnesium or potassium silicoaluminate, micronised magnesium silicate, precipitated alumina hydrate, asbestine, talc micronised or otherwise the like. However, it is also possible to use mineral opacifying pigments, such as the oxides of titanium, zinc, iron or chromium, the sulphides of zinc or cadmium, the phosphates of manganese or ammonium, the aluminates of cobalt or the like, provided that a higher power of irradiation is used, for example a greater number of ultra-violet radiators.

The foregoing distinctions between transparent and opacifying fillers relates solely to cases where compositions can be photopolymerised with ultra-violet rays. If these compositions are polymerised with an accelerated electron beam, these distinctions are no longer significant in view of the very high energy level of this type of irradiation. In other words, all mineral fillers can be used.

According to the intended applications, the radio-hardenable compositions according to the present invention may contain from 0 to 60 parts by weight of fillers per 100 parts by weight of composition.

Pigments or dyes

The pigments or dyes are added to the compositions according to the present invention in order to impart the desired colouring properties. These dyes or pigments must neither retard nor inhibit photopolymerisation of the binder; furthermore, they must neither react chemically with the photo- initiator system nor absorb it. They are preferably chosen from the products referred to in the "Colour Index", the absorption of which in wavelengths between 200 and 500 nanometers is as low as possible, insofar as the photo-hardening of compositions is effected by ultra-violet irradiation. As explained above concerning fillers, these considerations do not apply in the case of the hardening agent being bombarded with accelerated electrons since this type of irradiation has a far higher energy level than that of ultra-violet irradiation.

According to the intended applications, the compositions according to the present invention contain 0 to 40 parts by weight of pigments or dyes per 100 parts by weight of composition.

Preparation of compositions

If the compositions are intended to be used as varnishes, the binder is homogenised, i.e. the acrylic polyester according to the present invention is homogenised with the photo-initiator system and any adjuvants in a blender, if necessary with heating when the binder is very viscous, without, however, exceeding a temperature of about 80° C. in order not to initiate cross-linking. The mixture which results is left to cool; if the viscosity is too high for the intended use, it can be corrected by adding to the composition an adequate proportion of a di- (or poly) acrylate of a diol (or polyol) or ether diol (or ether polyol).

When the compositions also contain fillers and pigments (or dyes), for example when used as coatings, paints and inks, these fillers and pigments are dispersed in a part of the binder in an ordinary blender and this mixture is passed into a triple-drum apparatus, optionally with heating as indicated above, in order to obtain a homogeneous product in which the fillers and pigments are completely wetted by the binder. The photo-initiator system and the adjuvants are then added, after which the viscosity is adjusted with the remainder of the binder held in reserve. If necessary, the final viscosity of the composition is corrected with a di- (or poly) acrylate of a diol (or polyol) or ether diol (or ether-polyol).

The compositions according to the present invention are kept in containers which are opaque to light, in cool places, avoiding exposure to sunlight, either directly or through windows.

Viscosity of compositions

The viscosity of the compositions measured at 25° C. varies according to the use for which they are intended. Thus, for example, for the silk screen process, it should be about 50 to 150 poises and preferably in the vicinity of 80 poises. For flexography and application by roller, it is about 1 to 5 poises. If used as a coating, for example as a means of sealing timber, heavy cardboard and chipboard by the technique referred to as "reverse roll", the viscosity varies from about 1000 to 4000 poises and the same applies when the composition is used as a so-called "hot melt" adhesive. The details of viscosity given above are intended purely by way of illustration; according to the intended application, the viscosity of compositions according to the present invention may be modified, while remaining within the scope of the art skilled, by varying the nature of the components used in making the acrylic polymers according to general formula (I), the degree of polymerisation x of the prepolymer of general formula (II), the quantity of auxiliary di- or polyacrylate, the content and nature of the fillers and pigments, the content of additives, including the content of dispersing agents or thixotropic agents, and the like.

Radio-hardening apparatus

The compositions according to the present invention can be hardened in ultra-violet light emitted by medium pressure ultra-violet mercury vapour lamps of at least 80 W/linear cm., preferably fitted with a reflector, at a distance of about 8 to 50 cm. It is also possible to use less powerful ultra-violet radiators so long as the work is carried out in the absence of oxygen, which has a well-known radical polymerisation inhibiting action.

They are also hardenable with accelerated electron beams of at least 150 KeV and preferably of about 300 to 500 KeV, the power of the equipment used being a direct function of the thickness of the layer of composition which is to be hardened by polymerisation.

Rate of hardening

Under the influence of one or other of these methods of irradiation, the compositions of the present invention harden completely in a time which may range from a fraction of a second to approximately 5 seconds. In the Examples which follow, the rate of hardening is generally expressed by the linear speed of passage of the composition under the irradiation in m/min. As the width of the focused ultra-violet band is about 2.5 cm., a linear speed of 1.5 m/min. under an ultra-violet lamp represents an irradiation period of one second. Therefore, for a speed of passage of, for example, 15 m/min., this represents an irradiation time of 1/10th of a second.

Usages

Compositions which contain, as binders, the acrylic polyesters according to the present invention lend themselves to various industrial uses some of which are mentioned hereinafter.

For example, by association of the binder according to the present invention of general formula (I) with a substituted dimethylol acrylamide as described in British Patent Application No. 36920/77, filed Sept. 5, 1977, in the name of U.C.B., S.A., it is possible to prepare enamel compositions which resist ultra-violet soldering, and ultra-violet serigraphic (silk screen) marking inks for the manufacture of printed circuits. These ultra-violet inks may also be used for marking backing surfaces, such as paper, cardboard, glass, metal, plastics, simulated leathers (particularly those made from polyurethanes and PVC), for marking bottles made from PVC, polyethylene, polypropylene and the like. The compositions may also be used as varnishes and inks in flexography and as varnishes for application by rollers to the surfaces mentioned above, particularly to wood, cardboard and rigid and semi-rigid PVC. They can also be used as sealers and as paints for ultra-rapid hardening by bombardment with accelerated electrons, for finishing wood, hardboard, chipboard and the like and in the furniture and building industries. They can also be used as adhesives for the production of laminates and for all glueing applications using the so-call4ed "hot melt" technique.

Advantages

The acrylic polyesters according to the present invention have all the advantages inherent in this type of compound, inter alia, very high speed of hardening by ultra-violet irradiation or bombardment with accelerated electrons and excellent resistance to chemical agents, which is a characteristic feature of acrylic resins in general, while having virtually none of the drawbacks inherent in this type of compound. Indeed, by reason of the present invention, it is posible to prepare radio-hardenable acrylic polyesters using relatively inexpensive raw materials which are readily available. Furthermore, the method of manufacturing them is economically and technically advantageous, resulting in excellent yields. Furthermore, no ecological problems are encountered either at the production stage or in use. In particular, stress must be laid on the possibility of virtually unlimited alteration of the properties of the acrylic polyesters according to the present invention, in that only relatively minor changes are to be made in the choice of raw materials and conditions of manufacture in order to adapt them to the most varied specific uses.

The following Examples are given for the purpose of illustrating the present invention:

EXAMPLE 1

Preparation of a compound of general formula (I)

Into a double-wall glass reactor with a capacity of 3 liters and fitted with an agitator, a thermometer, a nitrogen inlet tube, a tube which is connected to a vacuum and an azeotropic distillation column, the following compounds are placed:
148 g. (1 mole) phthalic anhydride
212 g. (2 moles) diethylene glycol
10 g. benzene The pressure in the flask is reduced to 100 mm.Hg, after which atmospheric pressure is re-established with nitrogen. Heating follows, accompanied by stirring, and gradually the water formed during polyesterification is eliminated. In 15 hours, the temperature of the reaction mixture has risen from 150° to 180° C. and 18 ml. of water are collected. The acid index of the mixture is 4.2.

The mixture is cooled to a temperature below 50° C. and the following are added in succession:
292 g. (2 moles) adipic acid
272 g. (2 moles) pentaerythritol
504 g. (7 moles) acrylic acid (excess of approx. 1 mole)
600 g. benzene
40 g. p-toluenesulphonic acid in an aqueous solution at the rate of 67% by weight
2 g. cuprous oxide.

The pressure is lowered to about 100 mm.Hg and atmospheric pressure is restored with nitrogen; throughout the entire polyesterification process, a slight current of nitrogen is passed through. The water of polyesterification starts to separate off when the temperature reaches 85° C. In 7 hours, the temperature of the reaction mixture rises from 85° to 95° C. and at the end of this period 183 ml. of water are collected. The acidity of the reaction mixture is then 0.8 meq. H+/g. The reaction mixture is allowed to cool and benzene is added to adjust the content of dry matter to 25%. The reaction mixture is purified by successive washing with a 20% aqueous solution of sodium chloride. The organic phase is then dried over anhydrous sodium sulphate and filtered. 1000 ppm of stabilizer (hydroquinone methyl ether) are added to the organic solution.

The product of this example isolated by expelling the benzene under vacuum (30 mm.Hg) at a temperature below 50° C. The end product is a viscous liquid having the following characteristic features:
Yield: 1105 g. or 94% yield;
Viscosity at 25° C.: 320 poises;
0.52 meq. OH/g.;
0.19 meq. H+/g.;
contains about 6 acrylic unsaturations per chain;
diethylene glycol diacrylate content: about 5% by weight.

EXAMPLE 2

In situ preparation of a mixture of polyester of general formula (I) with an acrylic ester of general formula (III) formed in situ Prepolymer A: A=2AP+3NPG In a double-walled glass reactor with a capacity of 1 liter and fitted with an anchor-shaped agitator, a thermometer, a nitrogen intake, a connection to vacuum and an azeotropic distillation column, are placed 296 g. (2 moles) phthalic anhydride (AP), 312 g. (3 moles) neopentyl glycol (NPG) and 15 g. benzene.

At ambient temperature, the pressure is reduced to 50 mm.Hg and then again brought to atmospheric pressure with nitrogen. Throughout the entire esterification process, a slight current of nitrogen is allowed to pass through.

The reactor is heated by passing hot oil through the double jacket. When the temperature of the mixture reaches about 130° C., an exothermal reaction commences. The first drop of water formed by esterification is collected at a temperature of 71° C. at the top of the column. Esterification is continued for 13.5 hours, raising the temperature in the mixture of 205° C. The temperature at the head of the column is raised to about 79° to 80° C., no more water passes over and the acidity of the reaction mixture drops to below an index of 5.

In all, about 35 ml. of water are collected and the esterification solution contains 0.08 meq. H+/g., which corresponds to an acid index of 4.5.

The mass is cooled to 100° C. and slowly diluted with 130 g. benzene. This solution contains about 21% benzene and has a viscosity of 17 poises at 25° C.

General formula (I) polyester plus a general formula (III) acrylic ester prepolymer A+2AAD+2PE+66AA (general formula (I) polyester)+1PE+4AA (general formula (III) ester)

The following components are introduced into a glass reactor such as that used above but having a capacity of 3 liters:
717 g. (1 mole) prepolymer A 292 g. (2 moles) adipic acid (AAD)
408 g. (3 moles) pentaerythritol (PE)
720 g. (10 moles) acrylic acid (AA)
600 g. benzene
50 g. of a 67% aqueous solution of p-toluene-sulphonic acid
2 g. cuprous oxide.

A vacuum is applied at ambient temperature (100 mm.Hg) and then the pressure is restored to atmospheric pressure with nitrogen.

While being stirred, the mixture is heated and the first drop of esterification water collected when the mixture reaches 89° C. Esterification is continued for about 11 hours. At this time, 241 ml. water have been collected and the temperature of the mixture has risen to 95° C.; the acidity of the mixture is 0.78 meq. H+/g.

The mixture is allowed to return to ambient temperature and then poured into a 10 liter reactor fitted with an anchor-shaped agitator and a bottom valve. The mixture is diluted with 5200 g. benzene to give a benzene solution containing about 25% by weight of polymer.

Washing is then carried out with an aqueous solution to eliminate undesired products. Each washing is carried out by adding 1 liter of aqueous solution, stirring for 5 minutes to obtain a good dispersion, after which agitation is stopped and the aqueous phase is carefully decanted off; it is discarded prior to the next washing with water. Two washings are carried out in this manner with a 20% aqueous solution of ammonium chloride, then three washings with an aqueous solution containing 20% ammonium chloride and 5% sodium hydrogen carbonate, and finally a last washing with a 20% aqueous solution of ammonium chloride. The organic phase is then dried over anhydrous sodium sulphate.

The product is stabilized by adding 2 g. hydroquinone methyl ether and the product is isolated. The benzene is distilled off under a vacuum at an absolute pressure of 30 mm.Hg, without exceeding a temperature of 50° C.

The end product is a viscous liquid having the following characteristics:
yield: 1610 g. (92.5% of theory)
viscosity at 25° C.; 1260 poises
hydroxyl index: 42
acid index: 10
acrylic unsaturation content: 4.92 meq. dl/g.
Gardner coloration: 1-2
neopentyl glycol diacrylate content (arrived at by gel permeation chromatography (GPC): 4%

EXAMPLE 3

Further examples of an in situ mixture of general formula (I) polyester and general formula (III) ester.

By adopting the modus operandi described in Example 2, 11 further mixtures were prepared, numbered C1 to C11, which are in accordance with the present invention, plus 5 mixtures numbered NC1 to NC5 which are not in accordance with the present invention and which are introduced by way of comparison. These different mixtures are described in the following Table 2, in which :

the 1st column gives the number of the mixture the 2nd column the detailed composition thereof 3rd column the molecular weight of the prepolymer A—B$_2$ (part between square brackets in the second column)

the 4th column shows the viscosity in poises at 25° C., relating to the total mixture The 5th column gives the percentage of parasite diacrylate in the control mixture the 6th, 7th and 8th columns give respectively, the milliequivalents (meq.) of hydroxyl, acid and double bond per g. of total mixture the 9th column gives the talc reactivity in m/second of the total mixture.

The various compounds used for preparing these mixtures are designated by the following abbreviations:
AIP=isophthalic acid
DEG=diethylene glycol
AAD=adipic acid
PE=pentaerythritol
AA=acrylic acid
AP=phthalic anhydride
HD=hexane-1,6-diol
NPG=neopentyl glycol
TMPD=2,2,4-trimethylpentane-1,3-diol
PG=propylene-1,2-glycol
DPG=dipropylene glycol
EG=ethylene glycol
AM=maleic anhydride.

The figure preceding each of these symbols is the number of moles. In each case, the compound of general formula (III) is pentaerythritol tetraacrylate.

The table shows very clearly the reasons why, according to the present invention, R$_2$ and B and R$_1$ must originate from compounds which have a clearly defined chemical nature.

Thus, in Examples C$_1$ to C$_7$ according to the present invention, it will be seen that when the prepolymer in square brackets contains at least one dicarboxylic acid of which the COOH groups are each carried by a $>$C— group in the alpha-position (isophthalic acid AIP or phthalic anhydride AP) or by a =CH— group (maleic anhdride AM), the percentage of diacrylate does not exceed 5%. In Example C8 and C9, it will be seen that the same is the case, in spite of the fact that a diacid is used with —CH$_2$— groups in the alpha-position when the diol contains at least one secondary OH group (2,2,4-trimethylpentane-1,3-diol (TMPD) and propylene glycol (PG). In Examples C10 and C11,it will be seen that when the diacid has its COOH groups carried in the alpha-position by a $>$C— group and when, at the same time, the diol contains at least one secondary OH groups (dipropylene glycol DPG), the presence of diol diacrylate is no longer disclosed by gel permeation chromatography.

On the other hand, if the diacid has its two COOH groups carried by a —CH$_2$— group, and if the alcohol contains only primary OH groups, as in the case in Examples NC1 to NC4, which are not in accordance with the present invention, then the percentage of diacrylate becomes greater than 10%. This excessive content of diol diacrylate has repercussions on the talc reactivity; whereas Examples C1to C11 according to the present invention show reactivity levels in excess of 1.7 m/sec., reaching even 3.5 m/sec. in the case of Example C10, the Examples which are not in accordance with the present invention, on the other hand, i.e. Examples NC1 to NC4, have a reactivity ranging only from 0.7 to 1.3 m/sec.

In Examples NC5, the polyester contains no linear prepolymer according to the present invention. Therefore, obviously no diol diacrylate can form since a diol is not used in this Example. In spite of this, it will be seen that the talc reactivity is markedly below that in the Examples according to the present invention, i.e. Examples C1 to C11, despite the fact that the polymer NC5 is not diluted by diacrylate nor by pentaerythritol tetraacrylate.

2 parts by weight ethyl hexyl polyacrylate (dispersing agent)
2 parts by weight Sandorin green dye, and
25 parts by weight barium sulphate

*This condensation product is that designated BI in British Patent Application 36920/22, filed Sept. 5, 1977, in the name of U.C.B., S.A.

TABLE II

| Mixture No. | Composition | Molecular weight of A-B$_2$ | Viscosity poises at 25° C. | % diacrylate | meq. OH/g. | meq. H$^+$/g. | meq. dl/g. | reactivity m/s |
|---|---|---|---|---|---|---|---|---|
| C1 | [(1AIP + 2DEG) + 2AAD] + 2PE + 6AA + 1PE + 4AA | 598 | 360 | 4 | 0.35 | 0.21 | 5.5 | 2.0 |
| C2 | [(1AP + 2DEG) + 2AAD] + 2PE + 6AA + 2PE + 8AA | 598 | 70 | 5 | 0.50 | 0.21 | 5.7 | 2.0 |
| C3 | [(2AM + 3DEG) + 2AAD] + 2PE + 6AA + 1PE + 4AA | 734 | 475 | 3 | 0.60 | 0.22 | 4.8 | 2.4 |
| C4 | [2(1AP + 2DEG) + 3AAD] + 2PE + 6AA + 0.5PE + 2AA | 1050 | 410 | 5 | 0.47 | 0.26 | 3.5 | 2.4 |
| C5 | [(2AP + 3DEG) + 2AAD] + 2PE + 6AA + 1PE + 4AA | 834 | 450 | 4 | 0.38 | 0.26 | 4.5 | 2.8 |
| C6 | [(2AP + 3HD) + 2AAD] + 2PE + 6AA + 1PE + 4AA | 870 | 220 | 5 | 0.45 | 0.20 | 4.2 | 2.0 |
| C7 | [(2AP + 3NPG) + 2AAD] + 2PE + 6AA + 1PE + 4AA | 828 | 1260 | 4 | 0.75 | 0.18 | 4.9 | 3.0 |
| C8 | [(1AAD + 2TMPD) + 2AAD] + 2PE + 6AA + 2PE + 8AA | 658 | 190 | <1 | 0.25 | 0.17 | 6.2 | 1.7 |
| C9 | [(2AAD + 3PG) + 2AAD] + 2PE + 6AA + 2PE + 8AA | 704 | 250 | 5 | 1.0 | 0.6 | 6.5 | 1.8 |
| C10 | [(1AP + 2DPG) + 2AP] + 2PE + 6AA + 1PE + 4AA | 680 | 3000 | 0 | 0.10 | 0.22 | 4.6 | 3.5 |
| C11 | [(2AP + 3DPG) + 2AAD] + 2PE + 6AA + 1PE + 4AA | 920 | 3000 | 0 | 0.13 | 0.23 | 4.3 | 3.2 |
| NC1 | [(2AAD + 3EG) + 2AAD] + 2PE + 6AA + 2PE + 8AA | 640 | | 13 | 0.23 | 0.26 | 5.3 | 1.3 |
| NC2 | [(1AAD + 2DEG) + 2AAD] + 2PE + 6AA + 2PE + 8AA | 45 | | 11 | 0.57 | 0.11 | 6.5 | 1.3 |
| NC3 | [(1AAD + 2HD) + 2AAD] + 2PE + 6AA + 2PE + 8AA | 27 | | 12 | 0.50 | 0.15 | 7.0 | 0.8 |
| NC4 | [(5AAD + 6HD) + 2AAD] + 2PE + 6AA + 2PE + 8AA | 90 | | 13 | 0.45 | 0.33 | 4.1 | 0.7 |
| NC5 | 1AAD + 2PE + 6AA | 400 | | 0 | 1.1 | 0.14 | 7.7 | 1.6 |

EXAMPLE 4

"Hot melt" adhesive

2% by weight of a photo-initiator, such as benzil dimethyl ketal (Irgacure 651 of Ciba) are dissolved, with stirring, at 60° C. in 100 g. of the polyester (a) described in Table I. When dissolution is complete, agitation is discontinued but heating is continued for 1 hour in order to degasify the binder.

The binder is applied at 60° C. in the form of a string of about 1 mm. diameter along the edges of a sheet of glass measuring 80×150×3 mm. Another sheet of glass of the same size is then applied thereto and the two sheets are pressed lightly together to spread the string of binder over a width of 2 to 3 mm, whereafter the sheets are irradiated under an ultra-violet lamp of 880 W/cm at a speed of 0.25 m/sec., the lamp being at a distance of 8 cm. One hour after irradiation, it is no longer possible to separate the sheets again without breaking them.

EXAMPLE 5

Weld resist varnish for printed circuits.

Mix together:
55 parts by weight of mixture C7 shown in Table II
20 parts by weight of the condensation product of 2 moles acrylamide with 4.2 moles paraformaldehyde, 1 mole diethylene glycol and 2 moles n-butanol*
2 parts by weight 2-ethyl-anthraquinone This mixture is passed twice through a three-cylinder apparatus to obtain a perfectly homogeneous varnish. Viscosity at 25° C.: 80 poises.

Using the serigraphic technique, this varnish is applied to a copper printed circuit (copper deposit on a bakelite plate); the layer deposited is approx. 18 g/sq.m. The serigraphic screen is so made that the places which have to be subsequently engraved are not covered by the varnish.

The varnish is then hardened by passing the varnished plate at a speed of 5 m/min. and at a distance of 8 cm. in front of an ultra-violet lamp of 80 W/cm fitted with a semi-elliptical reflector.

The varnish which is thus hardened by ultra-violet rays adheres perfectly both in the copper and to the bakelite and offers good resistance to solvents and to finger nail application.

In the conventional manner, a thin layer of "flux" is then applied (a solution intended to facilitate subsequent tinning of the copper parts which are not coated with varnish). The solvent is evaporated from the "flux" either at ambient temperature or in a ventilated oven, after which tinning is carried out in a molten bath of lead-tin at a temperature of 250° to 260° C. For this purpose, the plate is placed with its copper covered side in contact with the surface of the molten metal bath for 8 seconds, the plate being moved to and fro to simulate the mechanical effect to the wave soldering process currently used in the industrial manufacture of printed circuits. The plate is then allowed to cool, the surface of the printed circuit cleaned with a rage dipped in acetone in order to eliminate residues of flux which may influence the results of mechanical resistance tests by protecting the ultra-violet varnish. These tests are the following:

(1) appearance of the hardened varnish: on bakelite: with no fault on the copper coated parts: no fault (no cracks, blisters or peeling of hardened varnish);

(2) cleanness of tinning: perfect, i.e. there is no molten tin which has found its way under the ultra-violet varnish applied to the coppered parts which may give rise to short-circuit across any two points of the weld which may come close to each other;

(3) resistance to finger nail: excellent;

(4) adhesion tests involving application to good quality adhesive paper: a simple tests with a sudden tearing action: excellent; test on cruciform cuts: excellent; test on square cuts (1 mm. square): excellent.

EXAMPLE 6

Effect of the linear structure of the prepolymer on the pliability of the binder obtained Three varnishes are prepared having the following composition (by weight):
40 parts of prepolymer defined hereinafter
47 parts hexane-1,6-diol diacrylate
3 parts benzophenone
10 parts N,N-diethylethanolamine acrylate (accelerator)
1 part Baysilon OL (silicon oil made by Bayer A.G.) (wetting and spreading agent).

The varnishes are applied to a cloth coated with polyurethane by means of a bar coating apparatus, to a thickness of 4 microns and then irradiation by two passes at a speed of 20 m/sec. under an ultra-violet lamp of 80 W/cm.

The samples are subjected to the following tests:

Bally test (literature: A. R. Payne, "Poromerics in the Shoe Industry", Elsevier, 1970, page 108) number of bending cycles which a varnish resists without showing any breaks or peeling.

Crumplemeter test (literature: Memorandum Creusot-Loire Instrumentation, Froissabilimeter, Model FR.01 to standard BNCF No.284F) number of crumpling cycles withstood by the varnish. The results obtained are shown below:

| Varnish | Number of cycles in both tests | |
|---|---|---|
| | Bally test | Crumplemeter test |
| NC5 (see Table II (no central prepolymer) | 1000 | 50 |
| Polyester (d) (see Table I) (6 branch structure not in accordance with the present invention) | 17,000 | 100 |
| Polyester (a) (see Table I) (linear structure according to the present invention) | 200,000 | 5000 |

EXAMPLE 7

Ultra-violet hardening inks (a) Ink for use in dry offset printing
15 parts by weight phthalocyanine blue
60 parts by weight mixture C10 (Table II)
15 parts by weight trimethylol propane triacrylate
5 parts by weight Irgacure 651 (photo-initiator of Ciba)
4 parts by weight dioctyl phthalate
1 part by weight PS-520 polyethylene wax (Hoechst)

When applied in a thickness of 1 g/sq.m. to a strip of paper and irradiated at various speeds under an ultra-violet lamp of 80 W/cm., the phenomenon of spotting only appears after 4 m/sec.

(b) Flexographic ink
40 parts by weight mixture C2 (Table II)
40 parts by weight hexane-1,6-diol diacrylate
5 parts by weight N,N-diethylethanolamine acrylate
2 parts by weight Baysilon OL (Bayer)
1 part by weight dioctyl phthalate
12 parts by weight phthalocyanine blue When applied in a thickness of 6 g/sq.m. on "Cellophane", this hardens perfectly at a speed of 20 m/min. under an ultra-violet lamp of 80 W/cm. Adhesion to the supporting surface and flexibility of the ink are good.

(c) Serigraphic ink
65 parts by weight mixture C7 (Table II)
20 parts by weight hexane-1,6-diol diacrylate
3 parts by weight Irgacure 651 (Ciba)
6 parts by weight N,N-diethylethanolamine acrylate
2 parts by weight ethyl hexyl polyacrylate (dispersing agent)
2 parts by weight benzidine AAMX yellow
2 parts by weight "Aerosil" 380 (matting silica)

When applied to a thickness of 18 g/sq.m. to paper, this ink hardens perfectly at 5 m/min. under an ultra-violet lamp of 80 W/cm. Adhesion is excellent and the hardened ink resists solvents (50 wipes with wadding impregnated with acetone).

EXAMPLE 8

Varnish applicable to various supporting surfaces.

40 parts by weight mixture C6 (Table II)
40 parts by weight neopentyl glycol diacrylate
5 parts by weight benzophenone
15 parts by weight N,N-diethylethanolamine acrylate
1 part by weight Baysilon OL (Bayer)

This varnish has a viscosity of 30 seconds in a Ford No. 4 cup and can be applied either by a flexographic varnisher or by direct or reverse roller varnisher. The talc reactivity in a 6 micron layer is 0.7 m/sec.

When applied in a coating of 6 microns thickness to rigid or semi-rigid PVC, paper, cardboard or polyurethane and hardened at 20 m/min. under an ultraviolet lamp of 80 W/cm, this varnish adheres perfectly (cruciform notch test) to the various supporting surfaces and is sufficiently pliable to undergo bending through 180° and is entirely resistant to 50 wipes with an acetone-soaked pad. Resistance to dirt and abrasion are also excellent.

This same varnish, applied at the rate of 15 g/sq.m. as a finishing coat on high quality wood, has a good gloss and resists 50 consecutive thermal ageing cycles of −20° C. to +50° C.

EXAMPLE 9

Laminating adhesive hardening under ultra-violet light 80 parts by weight of mixture C7 (Table II)
20 parts by weight tetraethylene glycol diacrylate
5 parts by weight Irgacure 651 (Ciba)

When applied in a thickness of 12 microns between two sheets of PVC, one of which is transparent, or between a sheet of paper and a sheet of transparent "Cellophane", this adhesive hardens at the rate of 10 m/min. by irradiation through the transparent sheet, using an 80 W/cm ultra-violet lamp.

Immediately after irradiation, the two sheets stick together well. On the following day, it is no longer possible to separate them without tearing the transparent sheet.

EXAMPLE 10

Varnish and paint hardening by action of an accelerated electron beam (a) Varnish (applicable with a roller varnisher)
30 parts by weight mixture C2
35 parts by weight tetraethylene glycol diacrylate
15 parts by weight 2-hydroxyethyl acrylate
10 parts by weight hexane-1,6-diol diacrylate
10 parts by weight Syloid 72 (matting silica)
1 part by weight Baysilon OL (Bayer)

(b) White paint (applicable with a screen coating machine)
20 parts by weight mixture C2
20 parts by weight butane-1,4-diol diacrylate
15 parts by weight hydroxybutyl acrylate
35 parts by weight titanium dioxide
10 parts by weight calcium carbonate
1 part by weight Baysilon OL (Bayer)

Conditions of irradiation:
Accelerator: 300 KeV–50 mA (Brown-Bovari)
Inert atmosphere (combustion gas)
Rate = 10 Mrad/second
Dose needed for hardening: 3 Mrads
Rate of passage: 23 m/minute.

The varnish is applied in a coating of 15 g/sq.m. to good quality wood, while the paint is applied in a coating of 80 g/sq.m. to hardboard previously treated with a sealer.
Results: good adhesion (cruciform notch test)
hardness: 4H (cannot be scratched with a finger nail)
resistance to solvents: excellent.

We claim:

1. Radiation-hardenable acrylic polyesters of the formula $$[A\{B-C-D_m\}_2]$$

wherein A is the radical of a linear polyester, said radical having the formula

wherein
$R_1$ is a radical derived from a dihydroxy compound selected from the group consisting of an aliphatic dihydroxy alcohol, an aliphatic dihydroxy ether-alcohol, an oxyalkylated aliphatic dihydroxy alcohol, an oxyalkylated aliphatic dihydroxy ether-alcohol and an oxyalkylated aromatic dihydroxy compound,
$R_2$ is a radical derived from a dicarboxylic acid selected from the group consisting of a dicarboxylic acid in which each carboxyl group is in the alpha-position with respect to a $-CH_2-$, $>CH-$ or $\equiv C-$ group and a dicarboxylic acid in which one carboxyl group is in the alpha-position with respect to a $>CH-$ group and the other carboxyl group is in the alpha-position with respect to a $\equiv C-$ group, and
x is an integer of from 1 to 20,
B has the same meaning as $R_2$,
C is a radical derived from an aliphatic polyhydroxy compound containing m+1 OH groups, one OH group of which is esterified with the dicarboxylic acid, the radical of which is designated B and the remaining m OH groups of which are esterified with acrylic acid, the radical of which is designated D, said aliphatic polyhydroxycompound being selected from the group consisting of an aliphatic polyhydroxy alcohol, an aliphatic polyhydroxy ether-alcohol, an oxyalkylated aliphatic polyhydroxy alcohol and an alkoxylated aliphatic polyhydroxy ether-alcohol, with the exception of glycerol,
D is a radical derived from acrylic acid and
m is an integer of from 2 to 7,
with the proviso that when $R_2$ and B both represent radicals derived from a dicarboxylic acid in which each carboxyl group is in the alpha-position with respect to a $-CH_2-$ group, the dihydroxy compound the radical of which is designated $R_1$ then must contain at least one secondary OH group.

2. A polyester according to claim 1, wherein the dihydroxy compound is ethylene glycol, 1,2-propylene glycol, 1,3-propylene glycol, 1,4-butanediol, 1,3-butanediol, 2,3-butanediol, 2,2,4-trimethyl-1,3-pentanediol, neopentyl glycol, 1,6-hexanediol, diethylene glycol, dipropylene glycol, dibutylene glycol, a polyethylene glycol or a polypropylene glycol.

3. A polyester according to claim 1, wherein the dihydroxy compound is oxyethylatedor oxypropylated bisphenol A, pyrocatechol, resorcinol, hydroquinone, p-xylylene glycol or p-hydroxybenzyl alcohol.

4. A polyester according to claim 1, wherein the dicarboxylic acid is malonic acid, succinic acid, glutaric acid, adipic acid, pimelic acid, suberic acid, azelaic acid, sebacic acid, maleic acid, fumaric acid, 1,4-cyclohexanedicarboxylic acid, 1,2-dihydrophthalic acid, $\Delta^4$-tetrahydrophthalic acid, 1,6-dihydrophthalic acid, o-phthalic acid, isophthalic acid, terephthalic acid, 3,6-dihydrophthalic acid, 4,5-dihydrophthalic acid, tetrachlorophthalic acid or tetrabromophthalic acid.

5. A polyester according to claim 1, wherein the aliphatic polyhydroxy compound is trimethylolethane, trimethylolpropane, pentaerythritol, dipentaerythritol, tripentaerythritol or sorbitol.

6. A polyester according to claim 1, which is the reaction product of 6 moles of acrylic acid with a polyester obtained by the reaction of 2 moles of pentaerythritol with the condensation product of 2 moles of diethylene glycol with 3 moles of phthalic anhydride.

7. A polyester according to claim 1, which is the reaction product of 6 moles of acrylic acid, 2 moles of pentaerythritol and 2 moles of adipic acid with a polyester selected from the group consisting of
the condensation product of 1 mole of phthalic anhydride with 2 moles of diethylene glycol,
the condensation product of 2 moles of phthalic anhydride with 3 moles of neopentyl glycol,
the condensation product of 1 mole of isophthalic acid with 2 moles of diethylene glycol,
the condensation product of 2 moles of maleic anhydride with 3 moles of diethylene glycol,
the condensation product of 2 moles of phthalic anhydride with 3 moles of diethylene glycol,
the condensation product of 2 moles of phthalic anhydride with 3 moles of 1,6-hexanediol,
the condensation product of 1 mole of adipic acid with 2 moles of 2,2,4-trimethyl-1,3-pentanediol, the condensation product of 2 moles of adipic acid with 3 moles of 1,2-propylene glycol, the condensation product of 2 moles of phthalic anhydride with 3 moles of dipropylene glycol.

8. A polyester according to claim 1, which is the reaction product of 6 moles of acrylic acid, 2 moles of pentaerythritol and 2 moles of phthalic anhydride with a polyester which is the condensation product of 1 mole of phthalic anhydride and 2 moles of dipropylene glycol.

9. Coating varnish, paint, ink or adhesive compositions curable by bombardment with accelerated electrons comprising at least one acrylic polyester of claim 1.

10. Coating, varnish, paint, ink or adhesive compositions curable by irradiation with ultraviolet rays comprising at least one acrylic polyester of claim 1 and a photoinitiator and/or a photosensitizer.

* * * * *